Feb. 4, 1936.  H. D. GEYER  2,029,366
SOLID LUBRICATING MATERIAL
Filed July 17, 1933

INVENTOR
*Harvey D. Geyer*
BY
*Spencer Hardman & Jehn*
HIS ATTORNEYS

Patented Feb. 4, 1936

2,029,366

UNITED STATES PATENT OFFICE 2,029,366

SOLID LUBRICATING MATERIAL

Harvey D. Geyer, Dayton, Ohio, assignor, by mesne assignments, to General Motors Corporation, Detroit, Mich., a corporation of Delaware Application July 17, 1933, Serial No. 680,740

8 Claims. (Cl. 267—47)

This invention relates to a dry solid lubricating material and in one embodiment to a relatively thin flexible lubricating sheet material adapted to be interposed between two solid surfaces to reduce sliding friction therebetween, particularly between the leaves of a multiple leaf spring such as are used in present day automobiles.

One object of this invention is to provide means for efficiently lubricating the leaves of a multiple leaf spring, or the like, which will greatly reduce and render substantially constant over long periods of use the amount of friction between the leaves and thereby provide a spring whose characteristics do not vary over a period of time. This feature is particularly advantageous in present day automobiles whose springs are equipped with hydraulic shock absorbers, since the shock absorbers may be adjusted to give the best riding qualities for the particular spring characteristics, which characteristics do not change materially during relatively long periods of use.

Another object of the invention is to provide such a lubricating strip having a thin resilient cushion layer on one side thereof adapted to be surface bonded to one of the two leaves between which it is interposed, which cushion layer equalizes or distributes the pressure of one leaf against the adjacent leaf instead of permitting localized high pressure at certain small areas in the leaf surfaces as is usually the case in ordinary automobile leaf springs.

Another feature of this invention is the elimination of squeaks and noises in the springs for long periods of use without any additional lubrication.

Other features of the invention are its neatness and cleanliness due to the dry lubricant employed which ordinarily lasts the normal life of the automobile, and the non-necessity of grease or oil or any other further lubrication of the springs, and the simplicity and small cost of manufacture.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figure 1:
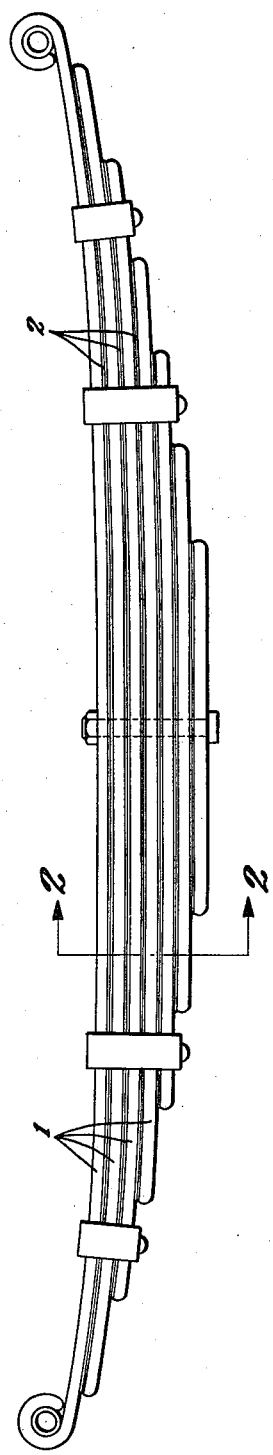
Fig. 1 is a side elevation of an automobile leaf spring having two lubricating strips of this invention interposed between each pair of contacting spring leaves.
Figure 3:
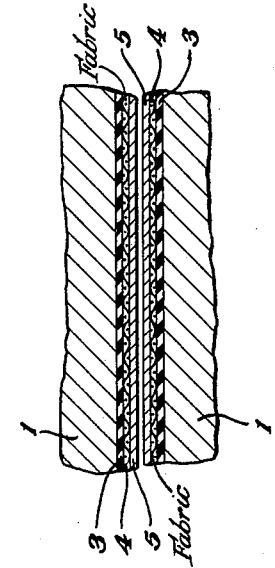
Fig. 3 is a magnified section through two of the spring leaves, illustrating the relative positions of the different layers of the two lubricating strips interposed between the two leaves. In this figure the normally contacting surfaces of the lubricating strips are shown separated for clearer illustration.
Figure 2:
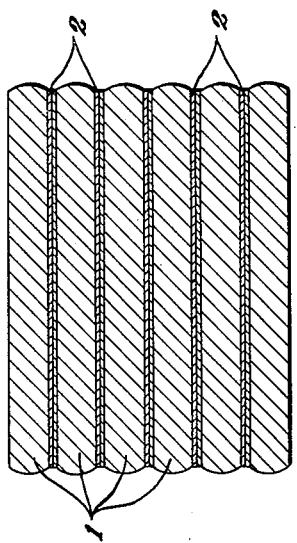
Fig. 2 is a transverse section on line 2—2 of Fig. 1.

The individual spring leaves of the multiple leaf spring 10 are designated by the reference numeral 1. Two lubricating strips 2 are shown interposed between each two adjacent leaves 1.

These lubricating strips 2 comprise a sheet of fabric 4 faced on one side with a thin cushion layer 3 of resilient rubber or the like, and on the other side with a thin coating 5 of a dry solid lubricating compound, both layers 3 and 5 being strongly bonded to the reinforcing fabric layer 4 and partially entering the fibers thereof so that the different layers merge into each other. Preferably the fabric 4 is a closely woven cotton textile fabric so that the rubber will not penetrate entirely through the fabric and so that high strength may be provided for a small thickness. The thickness of this fabric may vary dependent upon the use to which the finished lubricating strip is put, but for automobile leaf springs it is preferably about .024 inch thick before calendering. The resilient cushion layer 3 is preferably a fast-curing soft rubber compound. The lubricating layer 5 preferably consists primarily of a high viscosity cellulose nitrate and very finely divided amorphous graphite mixed therein to form a homogeneous mixture. By "high viscosity cellulose nitrate" is meant a cellulose nitrate having a viscosity of 3 seconds or more when determined by the 1931 tentative specification D—301 of the American Society for Testing Materials, the solid cellulose nitrate being dissolved in Formula "A" of this specification. Present tests show that cellulose nitrate having a viscosity in the neighborhood of 80 to 100 seconds by the above method of determining viscosity will give highly satisfactory abrasion resistance when used in the compounds of this invention. The higher the viscosity of the cellulose nitrate used the greater will be the amount of solvent, such as acetone, necessary to give a suitable fluidity to the final liquid compound, and hence economy of acetone or other solvent used and the time necessary to dry the compound dictates the upper limit to the viscosity of the cellulose nitrate used in any particular case.

In making such a lubricating compound the high viscosity cellulose nitrate is dissolved in acetone or other suitable solvent to provide a liquid sufficiently fluent to easily mix with the desired amount of finely divided graphite and still give the desired fluidity. The amount of graphite may vary considerably for different usages, but when such a strip is to be used for spring leaves preferably such an amount of finely divided amorphous graphite is added that when the solvent has been later evaporated the resulting compound will have about four parts of graphite to one part of high viscosity cellulose nitrate. The liquid mixture should preferably be of such a consistency that it may be readily applied with a brush so as to leave a fairly uniform thickness and smoothness of surface. Or it may be applied by spraying, in which case the fluidity may be varied to give the best results by adding more or reducing the amount of solvent in the compound.

The following is given as a specific example of a lubricating compound which is suitable for applying to the fabric 4 by means of a brush to form the lubricant layer 5 thereon:

| | Parts by weight |
|---|---|
| 1. Unreduced smokeless gun powder (derived from gun cotton and blended to give a viscosity of 80 to 100 seconds) | 6 |
| 2. Finely divided amorphous graphite | 26.3 |
| 3. Camphor | .8 |
| 4. Butyl lactate | 2.6 |
| 5. Ethyl alcohol | 3.0 |
| 6. Acetone | 61.3 |
| | 100.0 |

The camphor serves as a flexibilizing agent and hence the degree of flexibility of the final lubricating coating may be increased or decreased as desired by adding somewhat more or somewhat less camphor than as given in above formula.

The butyl lactate is a solvent for cellulose nitrate which is less volatile than the acetone which is used in the above formula as the main solvent, and hence a small addition of butyl lactate serves to slow down the rapidity of evaporation of the solvent after the compound is applied to the surface to be covered thereby. If in any case the drying of the coating occurs too rapidly to permit a smooth even flow of the liquid compound over the surface being covered therewith the rate of drying may be decreased by adding more butyl lactate. Conversely, the rate of drying may be increased if desired by reducing the percentage of or entirely omitting the butyl lactate in the solvent.

The ethyl alcohol is added to the main solvent in relatively small percentage to increase the solvent action of the acetone upon the cellulose nitrate.

The composite strip 2 may be made as follows:
A light skin coat 3 of uncured soft rubber compound is applied to one side of the fabric 4 by means of a calendar and left uncured in rolls.

The thickness of this skin coat is preferably about .006 inch but may be varied as desired. The rubber-covered fabric is then cut into sheets of convenient size and on the uncoated side thereof a layer 5 of lubricating compound is applied evenly to a suitable thickness, usually about .005 to .010 of an inch, by applying one to five coats thereupon. The sheets are then dried for a sufficient length of time to permit the evaporation of the solvent. The next step is to compress these sheets, coated on both sides, between two polished steel plates in a press for about five minutes, the platens of the press being heated with steam at about 287° F. The molding pressure upon the sheets is preferably about 750 lbs. per square inch during this time to properly vulcanize the rubber coating 3 and make both the rubber coating 3 and lubricant coating 5 penetrate deeper into the fabric 4, thus giving a better bond, and to simultaneously provide a smooth molded surface on both the lubricant coating 5 and the rubber coating 3. Any difference in the shrinkage of the coatings 3 and 5 on opposite sides of the fabric may be corrected, if necessary or desired, by applying a heavier coating on the surface which shrinks less or a lighter coating on the surface which shrinks more.

These sheets, thus formed, are then cut into strips 2 of the same width as the spring leaves, or to fit the bearing surface to which it is to be applied. The spring leaves 1 should first be chemically cleaned by washing, sand-blasting, or other suitable method; then a coat of rubber cement is applied to the metal surface and preferably another coat to the rubber coating 3 of the strip 2. The strip 2 is then strongly cemented to the metal surface by placing these cement coated surfaces together and applying enough pressure either by rolling or by a press to exclude all the trapped air and excess cement.

Preferably, but not necessarily, two of these strips 2 are used between each pair of contacting spring leaves 1, the rubber-coated side being surface bonded to the metal leaf so that no relative sliding takes place between the leaf 1 and its strips 2, and so that relative sliding between adjacent leaves occurs between the contacting surfaces of the lubricant coatings 5. The very thin resilient rubber layers 3 serve to take up any inequalities in the metal surface and thereby evenly distribute the bearing pressure over the hard smooth contacting bearing surfaces of the coatings 5. This feature is important since the life of the coatings 5 is greatly increased thereby, and also the characteristics of the spring when first put into use remains substantially unchanged since there are no high spots to wear away during a period of use and thereby give a change in the effective bearing area and consequent change in amount of friction between the leaves. The rubber layers 3 should be only sufficiently thick for the above described purpose, and not so thick as to permit by an internal shearing distortion thereof a perceptible movement between the metal surface and the fabric layer 4 attached thereto through the rubber layer 3.

If desired, instead of first curing the strips 2 and then cementing them to the metal surface as above described, the uncured strips may be properly laid directly upon the cleaned metal surface such as the spring leaves 1 and be vulcanized in situ directly thereupon by well known methods whereby a strong vulcanized bond between the rubber layer 3 and the metal surface is obtained.

The lubricant coating of this invention may be applied directly to the cleaned metal surface of the spring leaves and bonded directly thereto to form a long-wearing dry lubricant coating thereupon according to the disclosure in Geyer's copending application, Serial No. 649,929, filed January 3, 1933. This present application discloses various improvements over the disclosure in said prior application.

The chemically clean spring leaves may be dipped into the high viscosity cellulose-nitrate and finely divided amorphous graphite liquid compound, made as above described, and withdrawn endwise slowly from the compound at such a speed that the evaporation of the solvent upon the exposed portion of the leaf occurs fast enough to prevent the compound from flowing haphazzardly upon the leaf as it is being withdrawn and thereby forming an irregular thickness of lubricant coating thereupon. The fluidity of the lubricant compound, the rate of evaporation of the solvent used therein, and the speed of withdrawal of the article being coated should be so chosen in interrelation with each other that a smooth even coating of lubricant compound sticks to the surface of the article as it is being raised from the lubricant bath without irregular running of the wet lubricant compound over the surface of the article. In coating leaf springs for automobiles preferably this dipping process is repated from three to eight times for each leaf to provide a heavier and longer-lasting layer of lubricant coating thereupon.

While the compounds described hereinabove will provide a useful lubricant coating when this dipping process is used, the following compound has been found preferable for directly coating the separate leaves of automobile leaf springs:

| | Parts by weight |
|---|---|
| 1. Unreduced powder—from gun cotton smokeless powder and consisting of high viscosity cellulose nitrate plus diphenylamine and such retained solvents as are normally present (80 to 100 seconds viscosity) | 7 |
| 2. Finely divided amorphous graphite | 14 |
| 3. Camphor | 1 |
| 4. Butyl lactate | 3 |
| 5. Ethyl alcohol | 3.3 |
| 6. Acetone | 71.7 |
| | 100.0 |

The function of each of the ingredients in this compound is the same as described herein above in connection with the first formula. In this formula the weight of graphite is only twice that of the unreduced powder, which gives the greater toughness and bonding power of this compound to a clean metal surface. Also the slightly increased percentage of camphor present in this formula gives an increased toughness and flexibility to the final lubricant coating for the purpose of reducing any tendency of the coating to crack or break free over small areas when the spring leaves are flexed.

Other suitable flexibilizing agents may be used with any of the compounds described above, such as dibutyl phthalate and tri-cresyl phosphate, or mixtures of these with camphor. Also non-drying vegetable oils and blown oils, such as blown cotton seed oil, blown castor oil, etc., or mixtures of these may be used. The best percentage of plasticizer and/or flexibilizing agent or agents to be added to the compound in any given case may be easily determined by experiment to provide sufficient toughness and flexibility but not excessive softness to the final hard lubricant coating.

Also a suitable finely divided solid lubricant other than graphite may be used in any of the above described compounds, such as soap-stone, talc, mica, metallic soaps or the like.

While the form of embodiment of the present invention as herein disclosed, constitutes a preferred form, it is to be understood that other forms might be adopted, all coming within the scope of the claims which follow.

What is claimed is as follows:

1. A flexible lubricating strip for interposition between spring leaves, comprising: a fabric strip having a cushion layer of resilient non-metallic material on one surface thereof and a coating of dry lubricant bonded to the other surface thereof.

2. A flexible lubricating strip for interposition between spring leaves, comprising: a fabric strip having a cushion layer of resilient rubber on one surface thereof and a coating of dry lubricant bonded to the other surface thereof.

3. A flexible lubricating strip for interposition between spring leaves, comprising: a fabric strip having a cushion layer of resilient non-metallic material on one surface thereof and a smooth coating of a lubricating compound bonded to the other surface thereof, said coating comprising a finely divided solid lubricant and cellulose-nitrate.

4. A flexible lubricating strip for interposition between spring leaves, comprising: a fabric strip having a cushion layer of resilient non-metallic material on one surface thereof and a coating of a dry lubricating compound bonded to the other surface thereof, said coating comprising a finely divided solid lubricant embedded in a matrix of cellulose nitrate and a flexibilizing agent.

5. A lubricating covering comprising: a flexible fabric having a cushion layer of resilient non-metallic material adhering to one surface thereof, and a coating of a dry lubricating compound bonded to the other surface thereof, said coating comprising a finely divided solid lubricant and a binder of cellulose nitrate and a flexibilizing agent therefor.

6. A lubricating covering comprising: a flexible fabric having a cushion layer of resilient rubber bonded to one surface thereof, and a dry lubricant coating comprising very finely divided amorphous graphite and cellulose nitrate bonded to the other surface thereof.

7. A lubricating covering comprising: a flexible textile fabric having one surface thereof impregnated with resilient rubber and vulcanized in situ thereupon, and the other surface thereof impregnated with a mixture of graphite and cellulose nitrate.

8. A multiple leaf spring having a lubricating strip interposed between two adjacent leaves in non-slipping engagement with one of said leaves, said strip comprising: a fabric reinforcement having a cushion layer of resilient rubber on the non-slipping side of said fabric, the opposite side of said fabric having a cellulose nitrate coating containing a finely divided solid lubricant.

HARVEY D. GEYER.